Nov. 16, 1943.     G. A. MATTHEWS     2,334,571
CIRCUIT PROTECTIVE SWITCH
Original Filed May 7, 1940     2 Sheets-Sheet 1
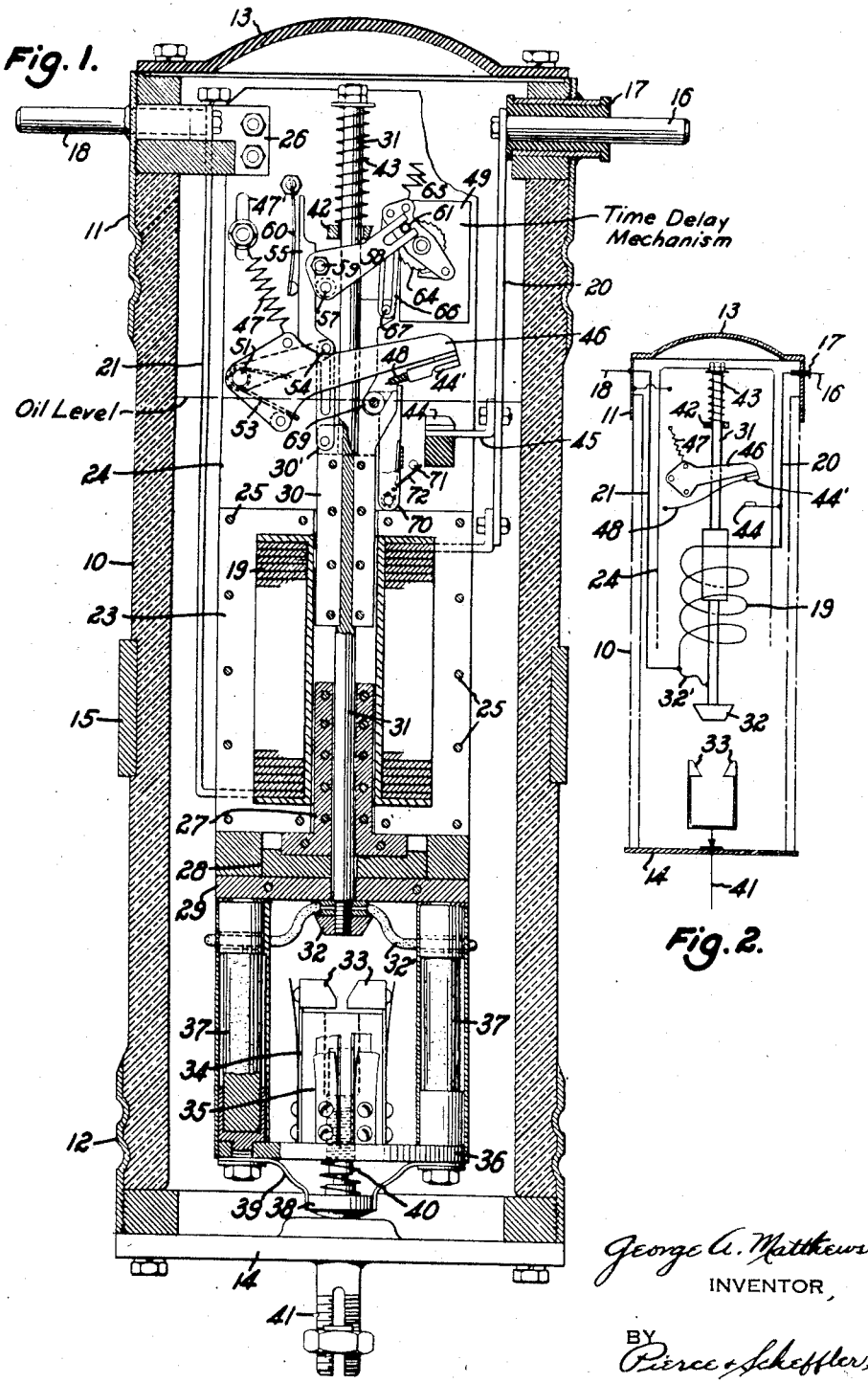
George A. Matthews,
INVENTOR,
BY
Pierce & Scheffler,
ATTORNEYS.

Nov. 16, 1943.   G. A. MATTHEWS   2,334,571
CIRCUIT PROTECTIVE SWITCH
Original Filed May 7, 1940   2 Sheets-Sheet 2
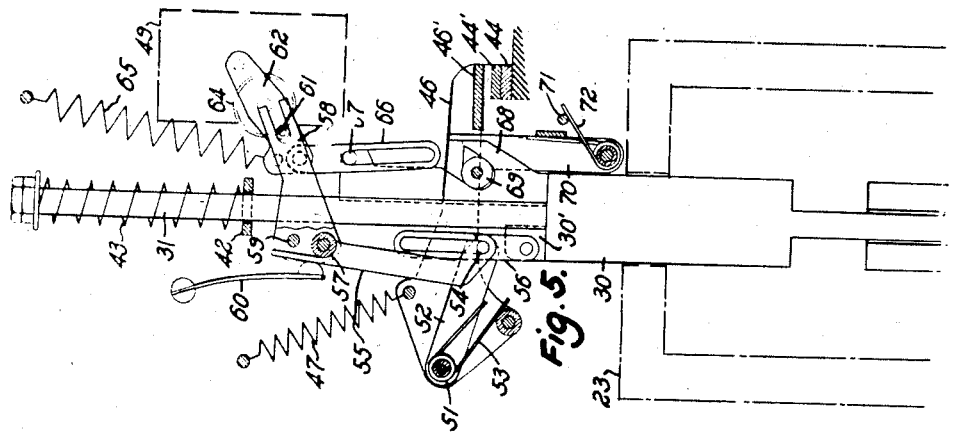
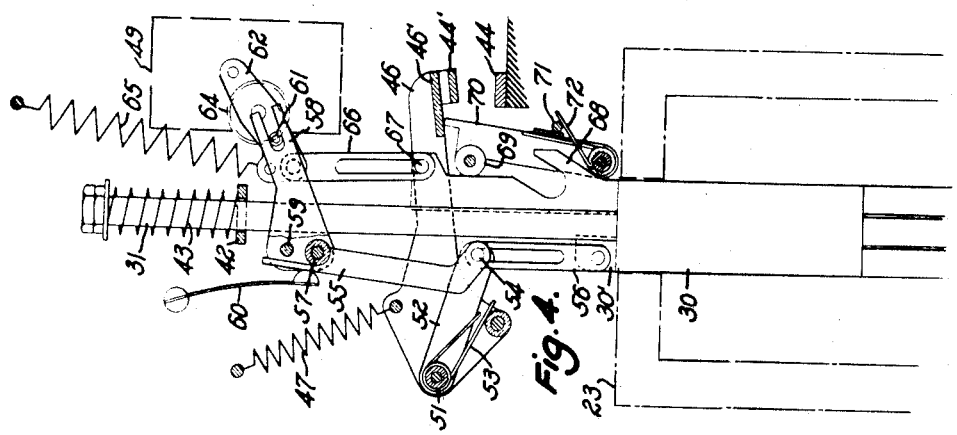
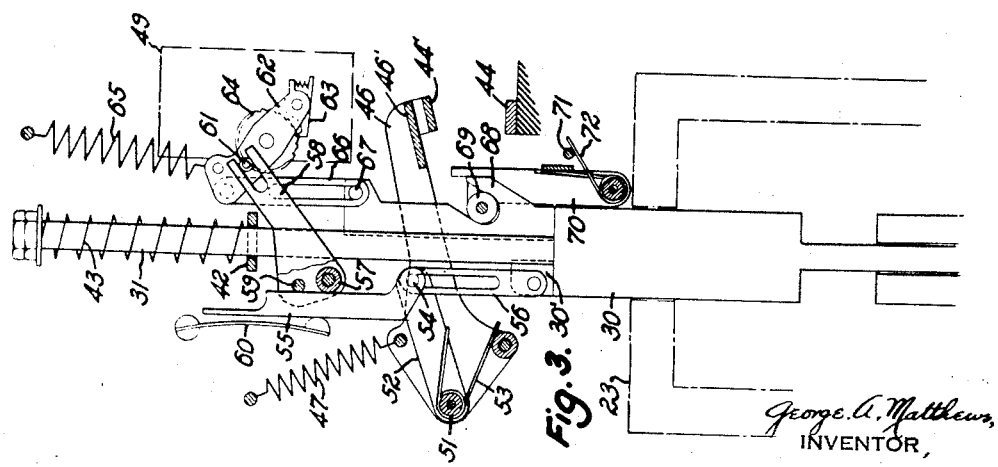
George A. Matthews,
INVENTOR,
BY
Pierce & Scheffler,
ATTORNEYS.

Patented Nov. 16, 1943

2,334,571

UNITED STATES PATENT OFFICE 2,334,571

CIRCUIT PROTECTIVE SWITCH

George A. Matthews, Detroit, Mich., assignor to The Detroit Edison Company, Detroit, Mich., a corporation of New York Original application May 7, 1940, Serial No. 333,875. Divided and this application April 13, 1942, Serial No. 438,823

14 Claims. (Cl. 200—97)

This invention relates to circuit protective switches and particularly to switches of the line shorting contactor type.

This application is a division of my copending application Serial No. 333,875, filed May 7, 1940, "Apparatus for protecting power lines," which describes and claims electrical distribution circuits that include line shorting contactors in addition to the customary protective switchgear and fuses.

The function of the line shorting contactor is to short circuit the line on which a fault occurs, thereby establishing a low-resistance short circuit, at a point intermediate the fault and its power source, of a current value equal to the full short circuit capacity of the power source obtainable at the point in the circuit where the intentional short circuit is applied by the line shorting contactor. The heavy flow of current through the intentional short circuit of the shorting device results in the rapid opening of the source breaker responsive to this heavy flow of current and not responsive to the lesser flow of current through the initial fault on the line before the operation of the shorting contactor. The operation of the shorting contactor to short the line is instantaneous upon fault inception. This instantaneous suppression of the initial fault beyond the shorting device substantially eliminates damage to the conductors at the fault and prevents the blowing of fuses located intermediate the shorting contactor and the initial fault. Generally the electrical distribution circuits are such that the number of shorting contactor installations should not be limited. The physical layout or the geography of the circuit governs the selection of the location or locations to be equipped with the devices. The line shorting contactor supplements, but does not replace, other equipment such as circuit breakers, or other timing devices that reclose the circuit a plurality of times and for periods of upward of 30 cycles in attempts to burn off the fault or the faulty branch circuit in the case of a permanent fault. The reclosing operations of the conventional switchgear take place in the conventional manner as the line shorting contactor includes a timing mechanism for preventing a second establishment of a line shorting circuit after the substantially instantaneous closure of the line shorting contactor and the subsequent opening of the short circuit which is placed on the line.

An object of this invention is to provide a circuit protective switch that closes substantially instantaneously upon the occurrence of a fault on the line beyond it, thereby to extinguish the current flow beyond the switch in a time far less than heretofore attainable. An object is to provide a normally open switch that includes mechanism for preventing reclosure of the switch for a predetermined period after a closure and subsequent opening of the switch. More particularly, an object is to provide a normally open switch having an operating coil for series connection in a distribution circuit to close the switch upon preselected overload conditions, and mechanical devices and circuit elements for preventing reclosure of the switch for a predetermined period after a closure and subsequent opening of the switch.

These and other objects and advantages of the invention will be apparent from the following specification when taken with the accompanying drawings in which:

Fig. 1 is a central section through a circuit protective switch embodying the invention;

Fig. 2 is a schematic diagram of the same; and

Figs. 3, 4, and 5 are sectional views of the coil shunting switch and time-controlled latching mechanism.

The protective switch or line shorting contactor is a fully automatic, self-contained unit housed within a chamber comprising a hollow insulator 10 with upper and lower metal sleeves 11, 12, and top and bottom closures 13, 14 that are bolted to the sleeves 11, 12, respectively. The central portion of the insulator 10 is grooved or otherwise shaped to receive a supporting bracket 15 by which the shorting contactor is mounted on a pole at any point in a circuit. A source or line terminal 16 enters the upper shell 11 through an insulating bushing 17, and a load terminal 18 extends through and is welded or otherwise mechanically and electrically connected to the shell 11. The operating coil 19 of the contactor is connected between the terminals 16, 18 by straps 20, 21, respectively, the coil 19 comprising a single or multiple layer solenoid wound from a flat copper bar. The coil 19 is mounted within a laminated core 23 that is secured between a pair of supporting plates 24 by bolts 25, and the plates 24 are secured to and grounded on the upper metallic shell 11 by brackets 26. The central section 27 of the laminated core rests upon a rubber cushioning member 28 to serve as a stop for the plunger, the cushioning member being carried by a plate 29 that is rigidly secured to the supporting plates 24. The armature or plunger 30 comprises laminations riveted to ribs 30' that are welded to the switch rod 31 and project above the laminations to carry a part of the control mechanism. The conical contact 32 on the switch rod 31 is axially alined with a conically recessed contact assembly comprising a plurality of wedge-shaped segments 33 on leaf springs 34. The lower ends of the springs 34 are secured to a cylinder 35 on a plate 36 that is supported from the plate 29 by a plurality of insulating rods 37. A pressure contact member 38 is connected to plate 36 by jumpers 39 and pressed into engagement with the lower closure 14 by a spring 40. A terminal lug 41 projects below the closure 14 for connection to similar lugs of the shorting contactors of other phases or to the conductor of a two-wire branch other than that to which source and load terminals 16, 18 are connected. The hollow insulator is filled with oil to a level above the core 23, and a low resistance connection from the load terminal 18 to the moving contact 32 is obtained through jumpers 32' that extend from contact 32 to the plate 29.

The upper end of the rod 31 extends through a strap 42 that is fixed to the supporting plates 24, and a spring 43 is coiled about the rod 31 to hold the rod in elevated position against the closing force developed by coil 19 at current flow less than a predetermined amount, for example 50%, above rated current that the contactor can carry for long periods.

The source or line terminal 16 is connected to the stationary contact 44 of a coil-shorting switch by the strap 20 and a jumper 45. The movable switch contact 44' is carried by an arm 46 pivoted upon the supporting plates 24 and normally retained in open-circuit position by a spring 47 that is anchored to plate 24 by a bolt adjustable along slot 47'. The arm 46 is grounded on the load terminal 18 through the supporting plates and preferably is connected to the plate 24 or to lead 21 by a jumper 48, see Fig. 2. A closure of switch contacts 44, 44' will short circuit the operating coil 19 and thus prevent operation of the shorting contactor. Time-delay mechanism, indicated generally by the block 49, is provided for retaining the switch 44, 44' in closed position for a predetermined interval following a closure of the switch.

The control mechanism for the shorting contactor is located between the upper ends of the supporting plates 24 and comprises a mechanical linkage having parts mounted on the plates 24 and other parts pivoted to the central ribs 30' of the laminated core. The control mechanism is illustrated in Figs. 3–5 as viewed from a plane through the axis of the rod 31, except that the timing mechanism is shown in elevation in Figs. 3 to 5.

The movable contact arm 46 comprises a pair of duplicate members mounted on plates 24 by a pivot pin 51 and joined at their outer ends by a strap 46' which carries the contact 44'. A link 52, also pivoted on pin 51, is coupled to the contact arm 46 through a hairpin spring 53 that urges the contact arm 46 clockwise when link 52 is rotated clockwise by the plunger. A pivot pin 54 connects the other end of link 52 to a latch member 55 and extends through an elongated slot in a link 56 that is pivoted to the core plate 30'. The upper end of the latch member is cut back for locking engagement with a roller 57 on the pivot pin of a lever 58, the latch member being pressed toward the roller 57 and a latch-releasing pin 59 on lever 58 by a spring 60. The forked outer end of lever 58 receives a pin 61 on a timing lever 62 carrying a pawl 63 that bears on ratchet wheel 64 on the shaft of an escapement mechanism of conventional type, indicated by the block 49. Pawl 63 drives the ratchet wheel clockwise when lever 62 is rocked in that direction by a spring 65, and rides idly over the ratchet wheel when the lever is moved counterclockwise by a link 66 having an elongated slot receiving a pin 67 on the core plate 30'. The core plate 30' has an inclined slot, defined by a notch in the plate and a projection 68, for receiving a roller 69 on a "hold-off" link 70 that is pivoted to the supporting plates 24 and urged clockwise towards a stop pin 71 by a spring 72.

The control mechanism operates in the following manner. The arm 46 is normally held in raised position by the spring 47, and the roller 69 of link 70 is seated in the inclined slot of the core plate 30', as shown in Fig. 3. A predetermined current flow through coil 19 overcomes the spring 43 and moves the core 30 and rod 31 downwardly to close the shorting contactor, and the several parts then have the positions shown in Fig. 4. Link 56 moves the latch member 55 down into locking engagement with the roller 57, and rocks the link 52 clockwise to stress the spring 53 that urges the contact arm 46 towards closed position. The drop of the plunger released the roller 69 of link 70 from the slot in the core plate 30', and thereby forced link 70, in conjunction with the spring 72, clockwise to the stop 71. This brought the upper end of link 70 into the path of the bar 46' of the contact arm 46 and thus prevented a closure of the coil-shunting contacts 44, 44'. Link 66 moved the timing lever 62 counterclockwise and thereby stressed the spring 65 that is to restore the timing lever to normal position with a time-delay that is controlled by the escapement mechanism 49. The latch-release pin 59 is now spaced from the latch member 55.

Upon the first opening of the circuit breakers, the rod 31 is lifted by the spring 43 and the parts assume the positions shown in Fig. 5. Link 52 cannot move up as it is locked by the engagement of latch member 55 with the roller 57, and the stress in the spring 53 tends to move the contact arm 46 clockwise to close contacts 44, 44'. This closing motion takes place as soon as the core assembly moves upwardly to force the roller 69 of link 70 into the inclined slot by the projection 68. The elongated slot in links 66 permits the core assembly to lift, but the counter-clockwise movement of the timing lever 58 is retarded by the escapement mechanism 49 since the timing lever is locked to the escapement mechanism by the pawl 63 and ratchet wheel 64. The time-delayed return movement of the lever 58 displaces the pin 59 into engagement with the latch member 55 to force it out of locking engagement with the roller 57. When released from roller 57, the latch member 55 is moved upwardly by the spring 53 thus releasing the stress in that spring and thereby permitting the spring 47 to rock the arm 46 counterclockwise to open contacts 44, 44'. The equipment is thus reset to the condition shown in Fig. 3 after a time-delay determined by the escapement mechanism 49. The time-delay is sufficient, for example of the order of three minutes as explained in detail in the copending application, to permit a reclosing circuit breaker to operate through a predetermined time-delay to a lockout in the case of a permanent fault on the line.

It is to be noted that, upon the initial removal of current by the circuit breaker, the immediate reclosure of the shorting contactor is blocked electrically by the switch 44, 44' that shunts the coil 19, and is blocked mechanically by roller 69 and its supporting link 70 that is blocked against clockwise movement by the strap 46' of the closed contact arm 46.

The critical current value for actuating the shorting contactor is determined by the number of turns of the coil 19, and the forces exerted by springs 43, 47, 53 and 65. The period of blocked operation is determined, for any given escapement mechanism, by the force developed by the spring 65 and by the gear train in the escapement mechanism. A control of the operating characteristics is readily attained by adjusting the compression of spring 43 by the downward or upward movement of the lock nuts on the end of the rod 31. The spring 43 opens the shorting contactor in about 5 cycles after the circuit breakers of the distribution circuit open, but the exact opening time is not important since the first reclosure of the circuit breaker is delayed for from 30 to 60 cycles as a protection against multiple lightning strokes. The shorting contactor must open under no-load, however, as the simple design which facilitates an instantaneous closure makes no provision for extinguishing an arc between the main contacts.

Operating speeds of the order of from 2 cycles down to ½ cycle, on a 60 cycles per second distribution circuit, have been obtained in mechanically stable equipment such as shown in Fig. 1, and commercial installations have fully demonstrated that this high operating speed protects insulated conductors from burn off from transient faults and prevents the blowing of sectionalizing fuses by transient faults. The line shorting contactor does not, and is not intended to, protect the conductors against burn off in the case of a permanent or relatively permanent fault as the shorting contactor locks out after its first operation to permit the conventional time-delayed operation of a reclosing circuit breaker or a repeater fuse assembly. The maximum service is maintained on the network, and the location of the fault is most readily ascertained, when the faulty branch circuit is isolated by sectionalizing fuses or is burned off during the sequence of operations of a reclosing circuit breaker prior to a final lockout.

It is to be understood that adequate protection against burn off from transient faults may be had on some feeders when the fault current continues for more than about ½ to 2 cycles, on a 60 cycles per second basis, but line shorting contactors of this high operating speed may be readily manufactured in accordance with this invention and there is no advantage in designing the switch for a longer operating time. The invention is not limited to the particular embodiment herein shown and described, and various changes may be made in the parts, and in their design, size and relative arrangement without departure from the spirit of my invention as set forth in the following claims.

I claim:

1. A line shorting contactor comprising a normally open switch having relatively movable contacts for connection to opposite sides of a power distribution line, electrically-actuated switch closing means, blocking means operative upon an opening of said switch to prevent reclosure thereof, and time delay means for rendering said blocking means inoperative.

2. A line shorting contactor as recited in claim 1, wherein said blocking means includes means mechanically locking said relatively movable contacts in switch open position.

3. A line shorting contactor as recited in claim 1, wherein said blocking means includes electrical means rendering said switch-closing means inoperative.

4. A line shorting contactor as recited in claim 1, wherein said blocking means includes means mechanically locking said relatively movable contacts in switch open position and electrical means rendering said switch-closing means inoperative.

5. A line shorting contactor comprising a normally open switch having relatively movable contacts for connection to opposite sides of a power distribution line, electrically-actuated switch-closing means including a coil having terminals for series connection in one side of the line, blocking means operative upon an opening of said switch to prevent reclosure thereof, and time delay means for rendering said blocking means inoperative.

6. A line shorting contactor comprising a switch having relatively movable contacts for connection to the opposite sides of an electrical power distribution line, means biasing said contacts to switch open position, electromagnetic means including an operating coil in series in one side of said line for closing said switch contacts, blocking means responsive to an opening of said switch contacts to prevent reclosure of said switch, and time delay means for rendering said blocking means inoperative.

7. A line shorting contactor comprising a switch having relatively movable contacts for connection to the opposite sides of an electrical power distribution line, means biasing said contacts to switch open position, electromagnetic means including an operating coil in series in one side of said line for closing said switch contacts, blocking means responsive to an opening of said switch contacts to close a shorting circuit about said operating coil, thereby preventing a reclosure of said switch, and time delay means to open said shorting circuit.

8. A line shorting contactor as recited in claim 7, wherein said blocking means includes means mechanically locking said relatively movable switch contacts in switch open position.

9. A electromagnetic switch comprising an operating coil, a magnetic plunger assembly slidable within said coil and including a switch rod, a switch contact carried by said rod, a cooperating switch contact, means biasing said plunger assembly for movement to separate said contacts, means operative upon a switch opening movement of said plunger assembly to block a switch closing movement, and time delay means for rendering said blocking means inoperative.

10. An electromagnetic switch as recited in claim 9, wherein said blocking means includes means mechanically locking said plunger assembly against switch closing movement and means short-circuiting said coil.

11. In an electromagnetic switch, an axially movable switch rod carrying a contact, a cooperating switch contact, means biasing said switch rod for switch opening movement, a coil and plunger for moving said switch rod in the opposite direction to close said switch contacts, a normally open auxiliary switch for short-circuiting said coil, spring means stressed by a switch-closing movement of said plunger to bias said auxiliary switch towards closure, means locking said spring means in stressed condition, blocking means actuated by said plunger to control the closure of said auxiliary switch by said spring means in accordance with the position of said plunger, said blocking means being actuated into and out of blocking position by respectively a switch-closing and a switch-opening movement of said plunger, whereby said auxiliary switch can close only after a switch-opening movement of said plunger, and time-delay means for rendering said locking means inoperative.

12. In an electromagnetic switch, the invention as recited in claim 11, in combination with latch means for mechanically locking said plunger against switch-closing movement for a period following a switch-opening movement thereof, said latch means comprising said blocking means and said auxiliary switch.

13. A line shortening contactor comprising a normally open main switch having contacts for connection to opposite sides of a power distribution line, a coil and plunger for closing said main switch, a spring for opening said main switch, a normally open auxiliary switch for shunting said coil, means operable upon a closure and subsequent opening of said main switch to close said shunting switch, means to lock said shunting switch in closed position, and time delay means for releasing said locking means.

14. A line shorting contactor as claimed in claim 13, in combination with means including said shunting switch for mechanically locking said plunger against switch-closing movement during closure of said shunting switch.

GEORGE A. MATTHEWS.